(12) United States Patent
Blach

(10) Patent No.: US 8,172,450 B2
(45) Date of Patent: May 8, 2012

(54) EXTRUDER

(75) Inventor: Josef A. Blach, Lauffen (DE)

(73) Assignee: Blach Verwaltungs GmbH & Co. KG, Lauffen (DE)

( * ) Notice: Subject to any disclaimer, the term of this patent is extended or adjusted under 35 U.S.C. 154(b) by 971 days.

(21) Appl. No.: 12/084,804

(22) PCT Filed: Oct. 12, 2006

(86) PCT No.: PCT/EP2006/009847
§ 371 (c)(1),
(2), (4) Date: May 9, 2008

(87) PCT Pub. No.: WO2007/054173
PCT Pub. Date: May 18, 2007

(65) Prior Publication Data
US 2009/0274003 A1  Nov. 5, 2009

(30) Foreign Application Priority Data
Nov. 11, 2005 (DE) .......................... 10 2005 053 907

(51) Int. Cl.
*B01F 7/08* (2006.01)
(52) U.S. Cl. ................................ 366/83; 366/84; 366/85
(58) Field of Classification Search .................... 366/83, 366/84, 85
See application file for complete search history.

(56) References Cited

U.S. PATENT DOCUMENTS

| 4,215,942 A | 8/1980 | Seufert et al. |
| 5,836,682 A | 11/1998 | Blach |
| 2005/0084559 A1* | 4/2005 | Blach .......................... 425/208 |

FOREIGN PATENT DOCUMENTS

| DE | 813 154 | 9/1951 |
| DE | 27 50 767 | 5/1979 |
| DE | 77 01 692 U1 | 7/1980 |
| EP | 0 001 970 | 5/1979 |
| EP | 0 002 131 | 5/1979 |
| EP | 0 330 308 | 8/1989 |
| EP | 0 788 867 B | 8/1997 |
| EP | 1 316 399 A2 | 6/2003 |
| WO | WO 94/18466 | 8/1994 |
| WO | WO 00/46009 | 8/2000 |

OTHER PUBLICATIONS

International Search Report dated Jan. 19, 2007.
International Preliminary Report on Patentability dated Jun. 11, 2008.
Konstruktionsbuecher, Springer Verlag 1994.
"Passverzahnungen mit Evolventenflanken und Bezugsdurchmesser—Teil 1: Grundlagen", DIN 5480-1, Deutsche Norm, Mar. 2006, pp. 1-25.
"Passverzahnungen mit Evolventenflanken und Bezugsdurchmesser—Teil 2: Nennmasse und Pruefmasse", DIN 5480-2, Deutsche Norm, May 2006, pp. 1-40.
Passverzahnungen mit Evolventenflanken und Bezugsdurchmesser—Teil 15: Qualitaetspruefung, DIN 5480-15, Deutsche Norm, Mar. 2006.
Kunststoffe, Feb. 2005, p. 75.

* cited by examiner

*Primary Examiner* — Joseph Del Sol
*Assistant Examiner* — James Sanders
(74) *Attorney, Agent, or Firm* — Miller Canfield Paddock & Stone PLC; Mark L Maki

(57) ABSTRACT

In an extruder wherein the slip-on elements (1) have a cross-sectional profile comprising circular arcs corresponding to the maximum slip-on element diameter, the slip-on element core diameter and the center distance of the slip-on elements (1), the slip-on element (1) has no shaft-to-hub connection in the area of the circular arc corresponding to the slip-on element core diameter and/or it is provided at its ends with reinforcement segments (13, 14).

11 Claims, 2 Drawing Sheets

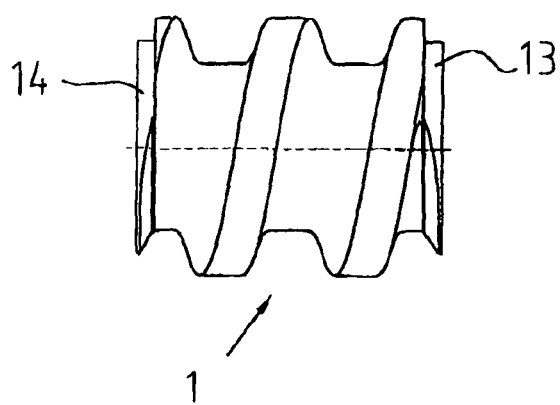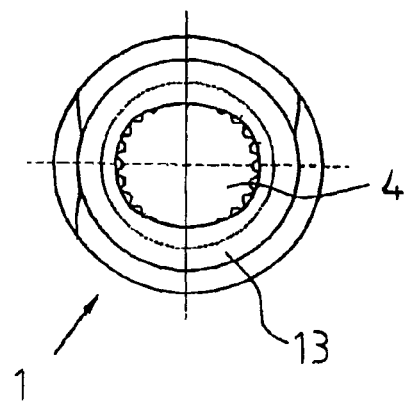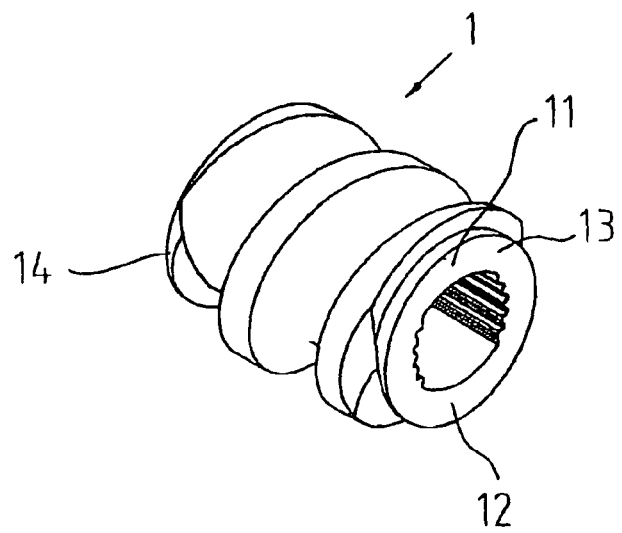

EXTRUDER

FIELD OF THE INVENTION

This invention relates to an extruder having at least two support shafts having slip-on elements configured as conveying and/or working elements.

BACKGROUND OF THE INVENTION

For nonrotatably connecting the support shaft with the screws or similar slip-on elements, different shaft-to-hub connections are known.

Thus, DE-C 813 154 discloses a machine with two shafts wherein a feather key or a square profile is used as a shaft-to-hub connection. According to DE 77 01 692 U1 a multiple spline shaft is used as a shaft-to-hub connection with an integrated spline, while DE 27 50 767 A1 and EP 0 001 970 A1 describe circular shafts with three separate sunk keys with the same pitch angle, and EP 0 330 308 A1 two keys with an unequal pitch angle. What is primarily used nowadays, however, is the involute shaft according to DIN 5480.

Further, there are described and compared in "Konstruktionsbücher," Springer-Verlag, 1984, pages 210 and 211, a variety of form-fitting shaft-to-hub connections with direct and indirect form closure with consideration of the fatigue notch factors and fatigue strength fundamental for the design of the machine. However, the hub has a constant wall thickness in these cases. In an extruder of the type wherein the screw elements or similar slip-on elements closely intermesh on the entire circumference, however, the axial profile of the slip-on element is determined by three circular arcs corresponding to the screw outside diameter, the screw core diameter and the center distance of the shafts (cf. EP 0 002 131 B1).

The most economical screw shaft is that with the greatest conveying volume and simultaneously the highest input torque. The total cross section of a screw conveyor system is limited by the diameter of the housing bore and the distance between adjacent housing bores. It must be distributed proportionately over four cross sections according to the technical requirements and possibilities as well as the demand. For transporting the product, the free conveying surface is first defined, which is determined by the outside diameter of the screw element and the flight depth. This also defines the core diameter of the screw element and the center distance relative to the adjacent support shaft. Secondly, the support shaft requires the calculated usable surface proportion for axially conducting the required shaft torque for the subsequent slip-on elements. Thirdly, the constructionally necessary surface requirement for transferring the proportionate torque for the slip-on element must be taken into account, and fourthly the remaining cross-sectional area of the slip-on element in relation to the support shaft torque for a dependable slip-on element is left.

Each support shaft, which generally has a length corresponding to at least twenty times the housing bore diameter, has a multiplicity of slip-on elements slipped thereon close together. The highest possible torque that can be transmitted to the greatest calculated usable support shaft diameter dTi crucially determines the economical use of the extruder.

The efficiency and economy of an extruder is therefore determined by highest permissible long-term torque at the same time as highest volume yield of the extruder.

It is described in "Kunststoffe" 2/2005, page 75, that the performance limiting machine element of a double-screw extruder is primarily the screw core diameter. The deeper the screw elements are cut, i.e. the greater the increase in free volume of the screw elements is, however, the smaller the remaining cross section for the screw core diameter and the associated shaft-to-hub connection will be. The problem is seen here in the tooth root strength of the DIN or a similar profile, so that an asymmetric toothing is proposed for better force transmission and stress distribution. Apart from the elaborate production of the asymmetric toothing, the performance of this extruder is also increasable further.

It is the object of the invention to substantially increase the volume yield of an extruder at equal torque.

SUMMARY OF THE INVENTION

This is achieved according to the invention by the extruder wherein torque transmission is achieved by two groups of splines or teeth separated by flat areas which do not transmit torque. Advantageous embodiments of the invention are rendered in the subclaims.

According to the invention, the flight depth of the conveying or similar slip-on element is increased at high torque transmission of the shaft-to-hub connection. That is, at equal center distance the outside diameter of the slip-on element is greater and the core diameter of the slip-on element reduced by the same measure, which considerably increases the free conveying surface of the conveying element or working surface of the working element and thus the performance of the extruder.

For this purpose, the slip-on element whose cross section comprises three circular arcs is (1) configured in the area of the circular arc corresponding to the slip-on element core diameter without a shaft-to-hub connection with flat contact against the support shaft and/or (2) provided at its ends with reinforcement segments.

The slip-on element has the smallest wall thickness in the area of the circular arc corresponding to the slip-on element core diameter. When the shaft transmits a torque, said shaft twists more than the slip-on elements which are harder and torsionally stiffer than the shaft. The slip-on element therefore absorbs this force in the particular area of the shaft. Upon this force transmission the ends at the lowest thickness of the slip-on element are exposed to the strongest load.

That is, it is necessary to at least maintain a minimum wall thickness of the slip-on element in the area of the circular arc with the slip-on element core diameter.

This is obtained in the invention by providing no force transmission of the shaft-to-hub connection in this area. Thus, the cross-sectional area that the shaft-to-hub connection otherwise occupies in this area can be added to the cross-sectional area of the slip-on element in this area and thus the flight depth accordingly increased without impairing the strength of the support shaft.

Since the usable support shaft diameter dTi does not change, there is no reduction of the transmittable torque.

A support shaft configured according to the invention can be produced in a simple manner by removing the toothing of the shaft, e.g. by grinding, from a conventional support shaft, e.g. an involute shaft as according to DIN 5480, in the area against which the slip-on element lies with its thinnest area corresponding to the circular arc of the slip-on element core diameter.

The surface with which the support shaft and the slip-on element fit in the area of the slip-on element with the circular arc corresponding to the slip-on element core diameter can be a surface curved in a circular arc, or a plane surface, i.e. one corresponding in cross section to a straight line.

Additionally and in the case of single-start slip-on elements, the slip-on element can be reinforced at its ends by preferably annular reinforcement segments in order to absorb the above-described great forces occurring at the ends of the slip-on element upon torque transmission.

The product flow is slowed down by the reinforcement segments, but this effect is partial and so slight that it does not play any part in practice.

As calculations and experiments have shown, the inventive extruder can increase volume yield by about 30% at equal torque.

Moreover, the invention increases the sealing surface preventing material from penetrating between the slip-on elements and the shaft and cracking there.

The shaft-to-hub connection in the inventive extruder is preferably constituted by an involute, serration or splined shaft connection. Suitable connections have proved to be in particular ones in which the keyways in the slip-on element and the teeth of the shaft are of rounded configuration.

The inventive extruder has at least two support shafts, but it can also have a substantially larger number of support shafts. The extruder can thus have for example at least three shafts parallel to the extruder axis and disposed in a cavity of an extruder housing along a circle or circular arc at equal central-angle distance, the extruder housing being provided on the radially interior and exterior sides of the cavity with concave circular segments parallel to the extruder axis with the slip-on elements being guided on said segments. The cavity can also be of annular configuration. Such an extruder is described e.g. in EP 0 788 867 B.

The conveying slip-on element is constituted in particular by a screw element, the working slip-on element e.g. by a backfeeding screw element with an opposite direction of thread, a kneader block, a blister or a toothed disk. It is also possible to provide slip-on elements having a conveying and a working portion.

BRIEF DESCRIPTION OF DRAWINGS

Hereinafter the invention will be explained in more detail by way of example with reference to the enclosed drawing. Therein are shown:

FIGS. 6, 7 and 8 show a side view front view and perspective view of a slip-on element according to a third embodiment.

DETAILED DESCRIPTION

Figure 1:
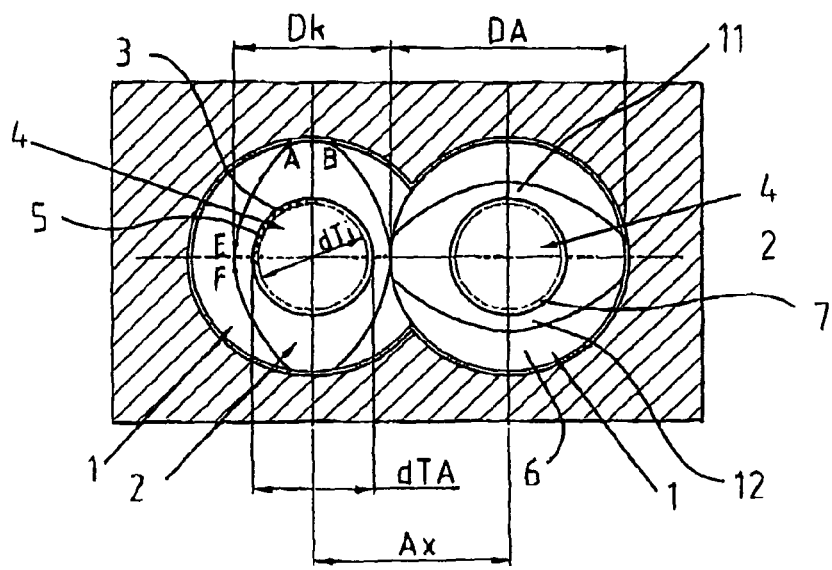
FIG. 1 shows the transverse profile of two screw elements closely intermeshing on the circumference in a twin-shaft extruder.

As shown in FIG. 1, two intermeshing slip-on elements 1 have a transverse or cross-sectional profile area 2 which is limited by circular arcs A-B, E-F and A-E. The circular arc A-B has a diameter corresponding to the maximum slip-on element diameter DA, the circular arc E-F a diameter corresponding to the slip-on element core diameter Dk, and the circular arc A-E a diameter whose radius corresponds at most to the center distance Ax of the two combined slip-on elements 1.

The slip-on element 1 has an internal toothing 3 engaged by the support shaft 4 with its external toothing 5. The slip-on element thus has a free conveying surface 6 that is determined by the diameter DA and the flight depth. Further, the surface proportion 7 for the shaft-to-hub connection is needed, which results from dTA and dTi.

Figures 2, 3:
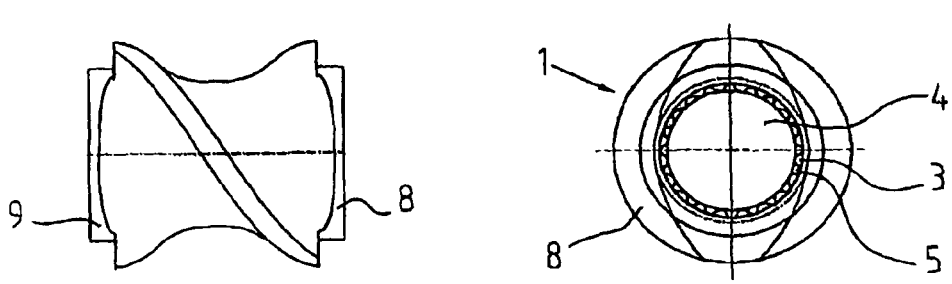
FIGS. 2 and 3 show a side view and front view of a slip-on element according to a first embodiment.

According to FIGS. 2 and 3, the slip-on element 1 configured as a screw element likewise has an internal toothing 3 engaged by the support shaft 4 all around with its external toothing 5. An involute toothing is provided here. At both ends of the slip-on element 1 there is an annular reinforcement segment 8, 9 provided at each end.

Figure 4:
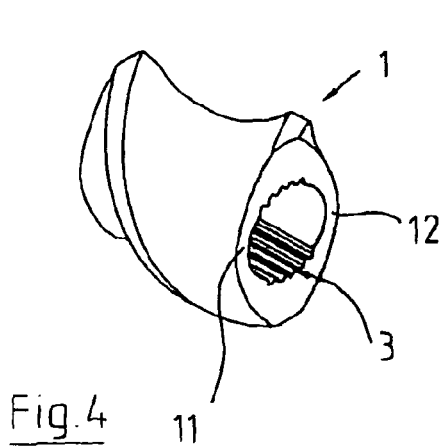
FIGS. 4 and 5 show a perspective view and front view of a slip-on element according to a second embodiment.
Figure 5:
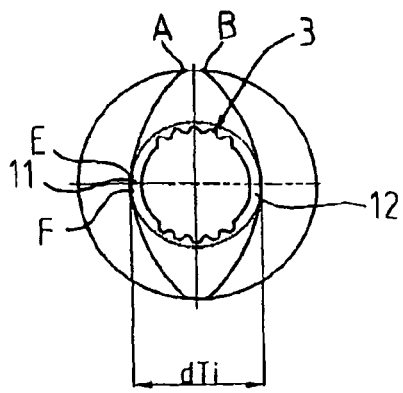

In the embodiment according to FIGS. 4 and 5, the two-start slip-on element 1 is configured without a shaft-to-hub connection in the thin area 11, 12 corresponding to the circular arc E-F. That is, both the slip-on element 1 and the support shaft 4 are of smooth configuration and fit together all over in the sector corresponding to the circular arc E-F. The keyways of the involute toothing 3 thus extend at the ends only into the thick-walled areas of the slip-on element 1 corresponding to the circular arcs A-E and A-B. That is, the areas 11 and 12 are not weakened by keyways at the ends. The toothings 3 have four teeth in each case on both sides of the thin areas 11, 12, i.e. in the areas opposite the circular arcs A-B, whereby five splines of the support shaft 4 engage each of the two toothings 3. That is, the torque transmission takes place with two groups of four teeth and five splines each, whereby the distance from one group to the other is greater than that from tooth to tooth or spline to spline of a group.

In the embodiment according to FIGS. 6 to 8, the areas of the single-start slip-on element corresponding to the circular arc E-F are firstly configured without a shaft-to-hub connection, and reinforcing rings 13, 14 are moreover provided at the ends, the reinforcing rings 13, 14 being configured as concentric rings. Furthermore, the shaft-to-hub connection is configured concentrically to the axis of the support shaft, as according to FIGS. 4 and 5. The support shaft 4 is so executed that the smoothly configured areas of the slip-on element 1 correspond thereto.

The invention claimed is:

1. An extruder having at least two axially parallel support shafts with slip-on elements configured as conveying and/or working elements slipped thereon antirotationally by a shaft-to-hub connection, said elements meshing with adjacent shafts, whereby at least some of the slip-on elements have a profile portion defined by a cross-sectional profile comprising a plurality of opposite pairs of first, second and third circular arcs (A-B, E-F and A-E) respectively corresponding to the maximum slip-on element diameter (DA), the slip-on element core diameter (Dk) and at most the center distance (Ax) of the slip-on elements defined between respective rotation axes of said support shafts, characterized in that the slip-on element is configured so as to have an annular reinforcement segment at each opposite end which projects from said profile portion, wherein said reinforcement segments define the shaft-to-hub connection, said reinforcement segments being provided, in the thin-walled areas of the second circular arcs (E-F) corresponding to the slip-on element core diameter (Dk), with contact surfaces which provide flat or partly flat contact against the support shaft so as to avoid torque transmission in the shaft-to-hub connection, and being provided with two groups of at least two splines or teeth each of which are provided for torque transmission in the shaft-to-hub connection, the distance from group to group being greater than that from tooth to tooth wherein said two groups are provided in the thick-walled areas of the slip-on element corresponding to the first circular arcs (A-B) in the profile portion.

2. The extruder according to claim 1, characterized in that each of the two groups has at least three teeth.

3. The extruder according to claim 1, characterized in that the slip-on element lies flat or partly flat against the support shaft in the form of a circular arc or straight line in the area of the contact areas without a shaft-to-hub connection.

4. The extruder according to claim 1, characterized in that the reinforcement segment is configured as a concentric ring or as a cam-shaped flaring ring.

5. The extruder according to claim 1, characterized in that the shaft-to-hub connection is an involute, serration or splined shaft connection.

6. The extruder according to claim 1, characterized in that the conveying elements are constituted by screw conveyor elements and the working elements by screw elements with an opposite direction of thread, kneader blocks, blisters or toothed disks.

7. The extruder according to claim 1, characterized in that a multi-spline shaft connection which is only partially effective on the circumference is provided for torque transmission in the shaft-to-hub connection.

8. The extruder according to claim 1, characterized in that the reinforcement segment is executed with a diameter that is greater than the slip-on element core diameter (Dk) and corresponds at most to the center distance (Ax).

9. The extruder according to claim 1, characterized in that said reinforcement segments project axially from opposite ends of said profile portion and terminate at respective segment end faces, said contact surfaces and said groups extending from said segment end faces interiorly into said slip-on element for cooperation with said shaft.

10. The extruder according to claim 9, characterized in that said contact surfaces and said groups of splines or teeth extend axially in said reinforcement segments respectively from said thin-walled and said thick-walled areas to said segment end faces.

11. The extruder according to claim 10, characterized in that each of said reinforcement segments has an annular surface concentric to said shaft axis associated therewith.

* * * * *